(12) United States Patent
Medic

(10) Patent No.: US 11,057,518 B2
(45) Date of Patent: Jul. 6, 2021

(54) SITE INFORMATION BUTTON

(71) Applicant: NCR Corporation, Atlanta, GA (US)

(72) Inventor: Vernes Medic, Bosnia and Herzegovina (BA)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 16/694,542

(22) Filed: Nov. 25, 2019

(65) Prior Publication Data

US 2021/0160370 A1    May 27, 2021

(51) Int. Cl.
*H04M 3/51*    (2006.01)
*G06F 3/0488*    (2013.01)

(52) U.S. Cl.
CPC ........ *H04M 3/5133* (2013.01); *G06F 3/0488* (2013.01); *H04M 3/5191* (2013.01)

(58) Field of Classification Search
CPC .. H04M 3/5133; H04M 3/5191; G06F 3/0488
USPC ...... 379/265.09, 265.05, 242, 245, 247, 246
See application file for complete search history.

(56) References Cited

U.S. PATENT DOCUMENTS

| | | | |
|---|---|---|---|
| 9,691,069 B2* | 6/2017 | Ilagan | H04L 12/66 |
| 2006/0054692 A1* | 3/2006 | Dickey | C08F 4/6565 |
| | | | 235/385 |
| 2016/0269895 A1* | 9/2016 | Soini | G06F 3/0482 |

* cited by examiner

*Primary Examiner* — Thjuan K Addy
(74) *Attorney, Agent, or Firm* — Schwegman, Lundberg & Woessner

(57) ABSTRACT

A local terminal is operable to display a user interface on a display of the terminal. The user interface includes a site information button. The local terminal is operable to receive a user input that corresponds to a user pressing the site information button. The local terminal is further operable to retrieve site information from a memory of the local terminal. The site information includes diagnostic information for the local terminal.

20 Claims, 6 Drawing Sheets

SITE INFORMATION BUTTON

SUMMARY

Disclosed is a local terminal for displaying a site information button. The local terminal operable to display a user interface on a display of the terminal. The user interface including the site information button. The local terminal operable to receive a user input that corresponds to a user pressing the site information button. The local terminal further operable to retrieve site information from a memory of the local terminal. The site information including diagnostic information for the local terminal.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

Corresponding reference characters indicate corresponding parts throughout the several views. The exemplifications set out herein illustrate exemplary embodiments of the disclosure, and such exemplifications are not to be construed as limiting the scope of the disclosure any manner.

DETAILED DESCRIPTION

Figure 1:
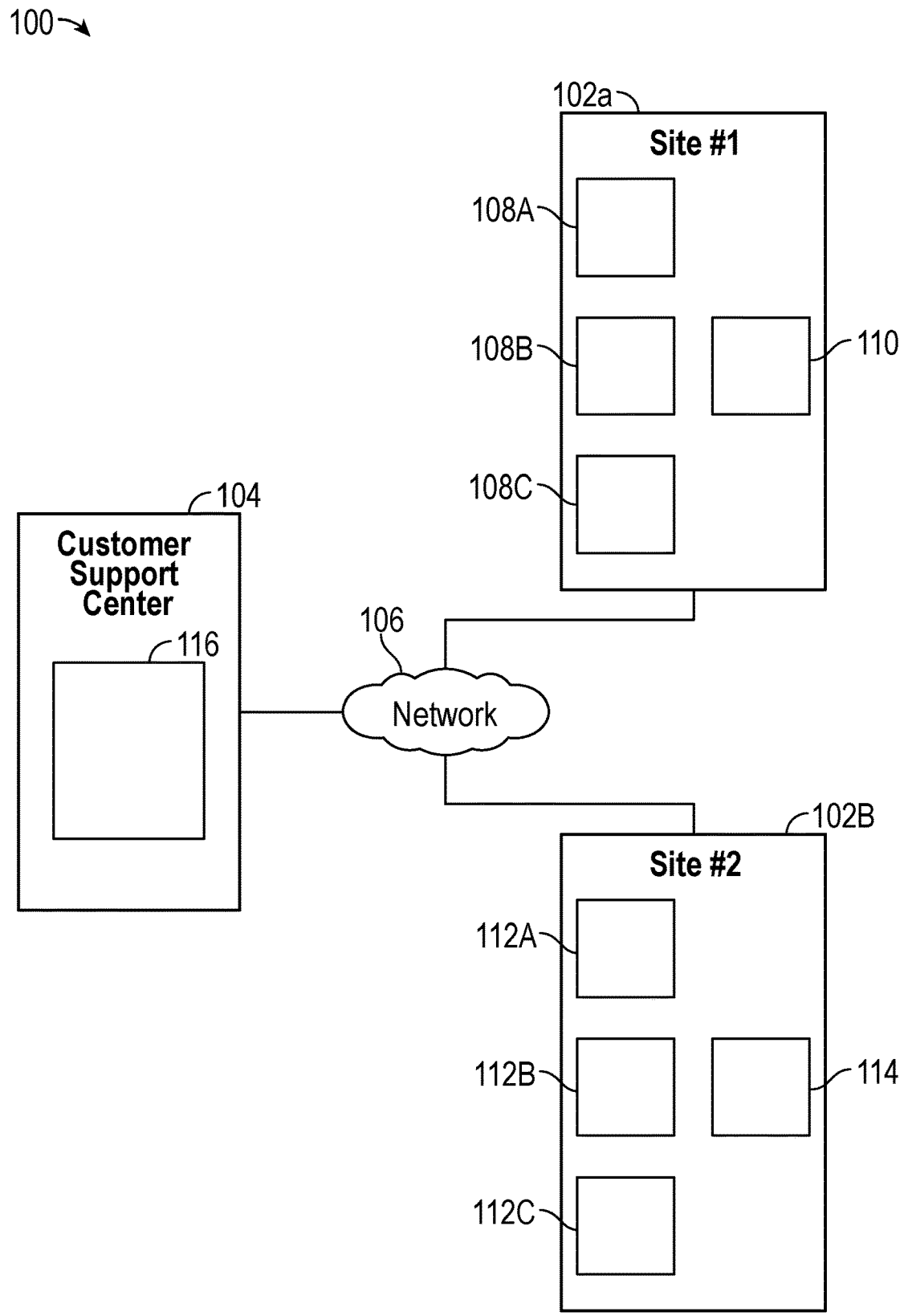
FIG. 1 shows an example schematic of a system consistent with this disclosure.

While working on a call, often it can happen (especially with new agents) that there is a problem when getting site info and location. For example, a site changed name, wrong information contained in a ticketing system, the caller is not on the site, the site is not added to ticketing system, a new manager on duty (MOD) on site doesn't know all the information, wrong ZIP code, etc. The lack of and/or misinformation can prolong addressing the issue for which a customer called.

Customer support may use command center software to assist customers. A non-limiting example of command center software is Aloha distributed by NCR Corporation of Atlanta, Ga. In legacy systems a command center ID key is needed to get site information and to connect to the site. In the past, new agents and new managers on duty struggled when taking/giving information and it sometimes takes up to 10 minutes or more to find the site in ticketing systems and in the command center before even starting to troubleshoot the issue(s).

As disclosed herein, implementation of a site information button can be of use for all helpdesk applications and other teams that may have direct communication with customers and where remote connection is needed. Using the site information button disclosed herein, customer service representatives can access ticking systems and site information without using the command center ID key. The result is a reduction in call time and providing all necessary information to agents in a shortened time frame. For example, using the site information button disclosed herein, the necessary information can be provided to the customer service representatives within a range of about 30 seconds to two minutes of a service call being received.

The site information button can represent a software button which is located at a backend system, such as a central computer that runs terminals in a store and on front end systems, such as the terminals controlled by the central computer. Upon pressing the site information button, all the necessary information about a site can be provided, which will significantly increase response time of helpdesk personnel and have high impact on customer satisfaction.

The site information provide by the site information button can include, but is not limited to, site name, address, email, phone numbers, number of terminals, printers, type of site (e.g., table service restaurant, fast food restaurant, grocery or retail store, etc.), methods of payment accepted and associated software (including version number, etc.), etc. Depending on the site and a user's service level agreement, the site information button can be customized to provide different information at different levels of granularity. For example, depending on the site and the configuration, site information can be filtered to remove unnecessary information or data.

Turning now to the figures, FIG. shows an example schematic of a system 100 consistent with this disclosure. System 100 can include a first site 102A and a second site 102B (collectively sites 102) and a customer support center 104 connected to sites 102 via a network 106. First site 102A can have a first terminal 108A, a second terminal 108B, a third terminal 108C (collectively terminals 108) and a backend terminal 110 that can be connected to terminals 108 via network 106 or other networks. Second site 102B can have a first terminal 112A, a second terminal 112B, a third terminal 112C (collectively terminals 112) and a backend terminal 114 that can be connected to terminals 112 via network 106 or other networks. Terminals 108 and 112 and backend terminals 110 and 114 may also be referred to as local terminals.

Support center 104 can have customer support terminal 116. While FIG. 1 shows a single customer support terminal 116, customer support center 104 can have any number of customer support terminals 116. In addition, system 100 can include any number of customer support centers 104. Custer support terminal 116 may also be referred to as a remote terminal.

While FIG. 1 shows sites 102 has having only three terminal, sites 102 can have any number of terminals. In additions, system 100 can have any number of sites 102. The various sites 102 can be owned and/or operated by a single entity or by different entities. For example, first site 102A can be owned by a first retailer and second site 102B can be owned by a second retailer.

During operation, a user at any of terminals 108 and/or 112 or backend terminals 110 and/or 114 can experience a problem that may require contacting a customer support representative at customer support center 104. When the user contacts the customer support representative, the customer support representative may need information about the user's terminal. For example, each of terminals 108 and 112 and backend terminals 110 and 114 can have a unique site identifier. The unique site identifier can allow each of terminals 108 and/or 112 or backend terminals 110 and/or 114 to be distinguished from one another. For example, the site identifier can be an alphanumeric text string that identifies the site and the terminal within a site. For example, first terminal 108A may have a site identifier of "102A108A" and backend terminal 114 may have a site identifier of "102B114."

As disclosed herein, the site identifier can be used by the customer support personnel to retrieve information about the terminal. For example, using the site identifier the customer support personnel can retrieve information such as a customer's software, service level agreement, and diagnostic information. For instance, using the site identifier, the customer support personnel can retrieve the version of the customer's software and to what extent the customer has contracted for service. The site identifier can also be used to establish a remote connection with the terminal needing service. For example, using the site identifier the customer service personnel can remotely log into a terminal as disclosed herein.

Figure 2:
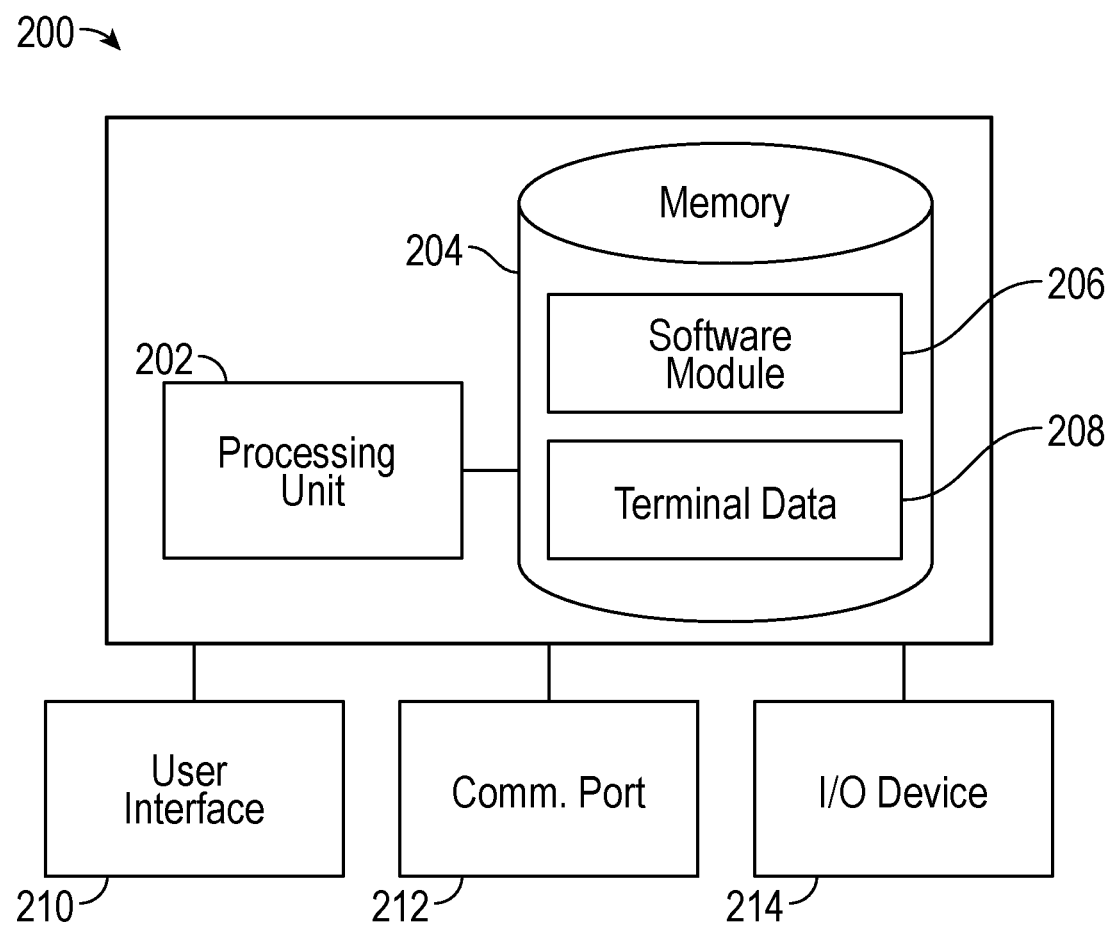
FIG. 2 shows an example schematic of a terminal consistent with this disclosure.

FIG. 2 shows an example schematic of terminal 200, such as any one of terminals 108 and/or 112 or backend terminals 110 and/or 114. As shown in FIG. 2, terminal 200 can include a processor 202 and a memory 204. Memory 204 may include a software module 206 and terminal data 208. While executing on processor 202, software module 204 may perform processes for servicing a terminal, including, for example, one or more stages included in method 400 described below with respect to FIG. 4. Terminal 200 also may include a user interface 210, a communications port 212, and an input/output (I/O) device 214.

As disclosed herein, terminal data 208 can include configuration files, log files, and other files that include information about terminal 200. For example, terminal data 208 can include configuration files that identify the point of sale (POS) or other software installed on terminal 200 as well as settings and permissions the current user may have. For instance, if a store manager is logged into terminal 200 the permissions may be administrator level privileges. The configuration files may also include the site identifier. Terminal data 208 can also include a site name, site location (e.g., a physical address), number of terminals located at a site, environmental variables, etc.

User interface 210 can include any number of devices that allow a user to interface with terminal 200. Non-limiting examples of user interface 210 include a keypad, a microphone, a display (touchscreen or otherwise), etc. For example, as disclosed herein, terminal 200 can include a display that displays a user interface, such as user interfaces 300 and 350 shown in FIGS. 3A and 3B.

Communications port 212 can allow terminal 200 to communicate with various information sources and devices, such as, but not limited to, terminals 108 and/or 112 or backend terminals 110 and/or 114. Communications port 212 can also allow terminal 200 to communication with other computing devices such as servers or other remote computers maintained by different entities. For example, communications port 212 can allow terminal 200 to communication with servers that may contain software updates and patches. Non-limiting examples of communications port 212 include, Ethernet cards (wireless or wired), Bluetooth® transmitters and receivers, near-field communications modules, etc.

I/O device 214 can allow terminal 200 to receive and output information. I/O device 214 may be incorporated into user interface 210. For example, I/O device 214 and user interface 210 can be combined into a touchscreen display. Non-limiting examples of I/O device 214 include, touchscreen displays, a camera (still or video), fingerprint or other biometric scanners, etc.

Figure 3A:
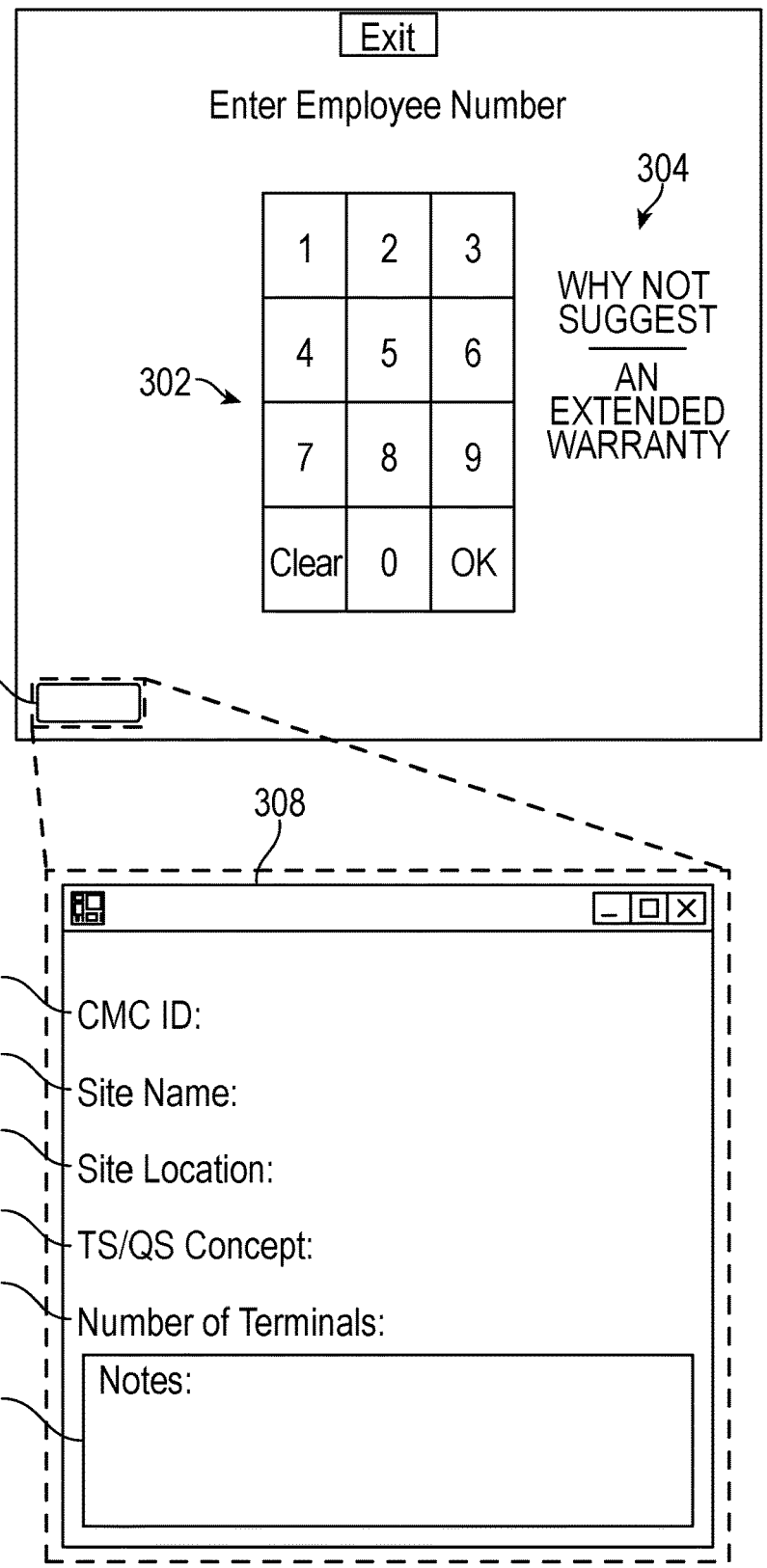
FIGS. 3A and 3B each shows an example of a user interface consistent with this disclosure.

FIG. 3A shows user interface 300. User interface 300 can be displayed on terminals, such as terminals 108 and 112 and backend terminals 110 and 114. User interface 300 can display a keypad 302 so that an employee can enter his or her employee number, PLU information, etc. user interface 300 can also display instructions 304, such as instructions for the employee to suggest additional items that may complement items being purchased (e.g., an extended warranty, batteries, etc.). User interface 300 can also include a site information button (SIB) 306.

Figure 3B:
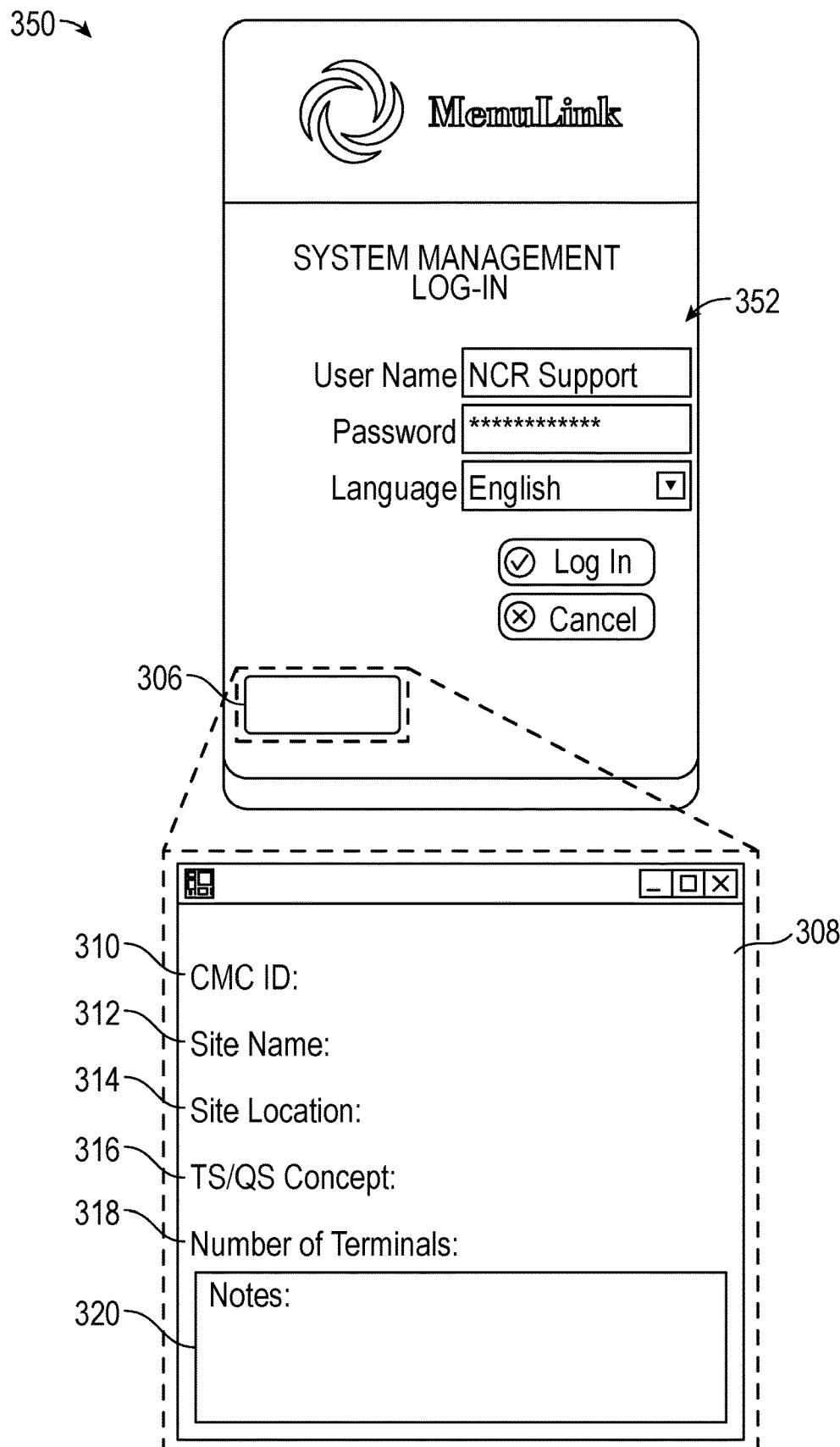

FIG. 3B shows user interface 350. User interface 350 can be displayed on terminals, such as terminals 108 and 112 and backend terminals 110 and 114. User interface 350 can also be displayed on terminals such as customer support terminal 116. User interface 350 can display login information 352 so that an employee can enter his or her login information at the beginning of a shift or at other times as appropriate. When displayed on customer support terminal 116 can allow a customer support representative to enter usernames and passwords to allow customer support terminal 116 to establish a remote connection to any one of terminals 108 and 112 and backend terminals 110 and 114. User interface 350 can also include a site information button (SIB) 306.

When there is a problem with a terminal, such as terminal 200, the user can press SIB 306. When pressed, SIB 306 can cause terminal 200 to display an information window 308. As disclosed herein, when the user presses SIB 306, terminal 200 can being a diagnostic process, such as method 400 described below with respect to FIG. 4.

Information window 308 can include site information, such as terminal data 208. For example, information window 308 can display a command ID 310 (which can be unique to a given terminal), a site name 312, a site location 314, a TS/QS concept 316, a number of terminals 318 located at site location 314, and notes 320.

TS/QS concept 316 can indicate that a food establishment is "TS," or table service, and can include an indication that food service is not "to go" or "to pick-up." In other words, the table service indicator can indicate that restaurants have places/tables where customers come to be served, order food and to eat. TS/QS concept 316 can indicate that a food establishment is "QS," or quick service, and can include an indication that food service is "pick-up" and/or "to go". In other words, quick service can indicate that customers come to the restaurant and order/pick-up their food and eat it somewhere else.

TS/QS concept 316 can allow the customer service representative to know the type of equipment and its use. For example, QS restaurants can have "Drive Thru" terminals and TS restaurants may not have them. This can be important for support personnel to know and for the customer from an importance/emergency perspective since drive thru terminals need to be in service as much as possible and any downtown needs to be minimized.

Also, QS restaurants may not have "money tips on checks" and TS usually do. This can be important for customer support personnel to know with regards to settling credit card batches since if the site settled their current credit card batch with the bank without entering tips, they will need to enter tips in different process.

Using the SIB, in both TS and QS cases, TS/QS concept 316 can be displayed along with other information for the customer support personnel to notify the customer support personnel as to which credit card software site is using, did they settled their credit card batch, importance of getting primary/specially terminal up, etc.

Figure 4:
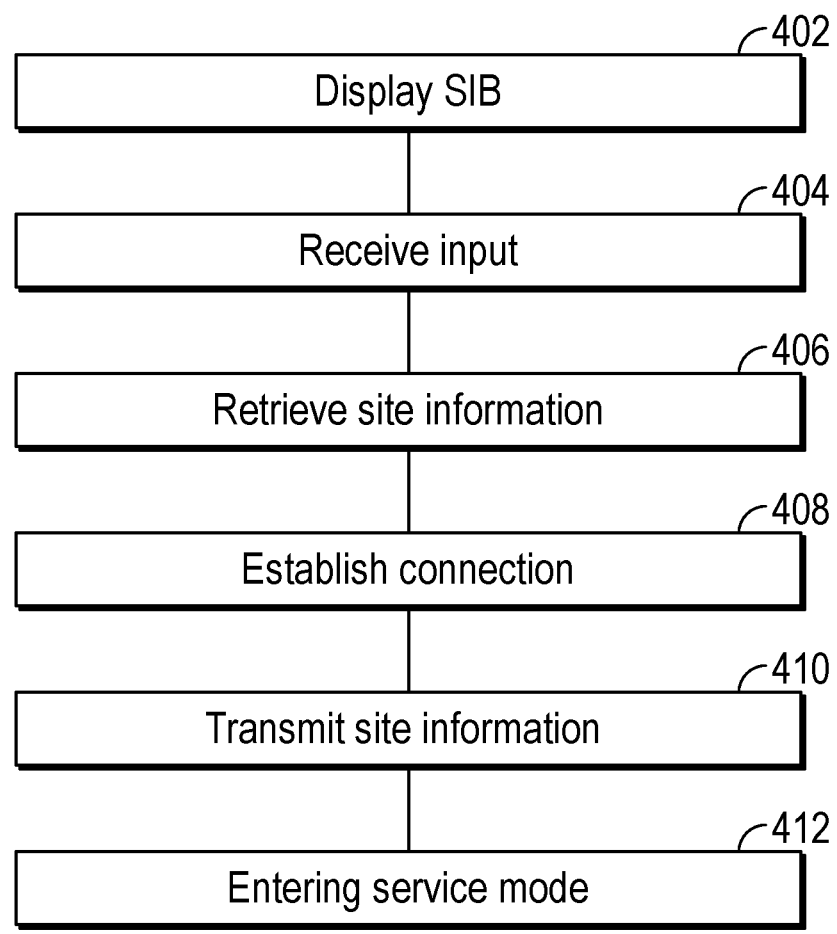
FIG. 4 shows an example method consistent with this disclosure.

FIG. 4 shows method 400. Method 400 can begin at stage 402 where a SIB, such as SIB 306, can be displayed. For example, a user can be using a terminal, such as terminal 200, and encounter an error or some other fault. Upon experiencing the error/fault, the SIB can be displayed. SIB can also be constantly displayed.

Upon experiencing the error/fault, the user can press the SIB (404). By pressing the SIB, the terminal can receive an input from the user. As disclosed herein, pressing the SIB can cause an information window, such as information window 308, to appear.

When the SIB is pressed, site information, such as terminal data 208, can be retrieved (406). Retrieving the site information can include retrieving the site information from a memory of the local terminal, such as memory 204. The site information can be stored and retrieved from a plurality of files stored in the memory. For example, a plurality of directories for the plurality of files can be searched. Each of the plurality of files can be stored in a respective one of the plurality of directories.

Figure 5:
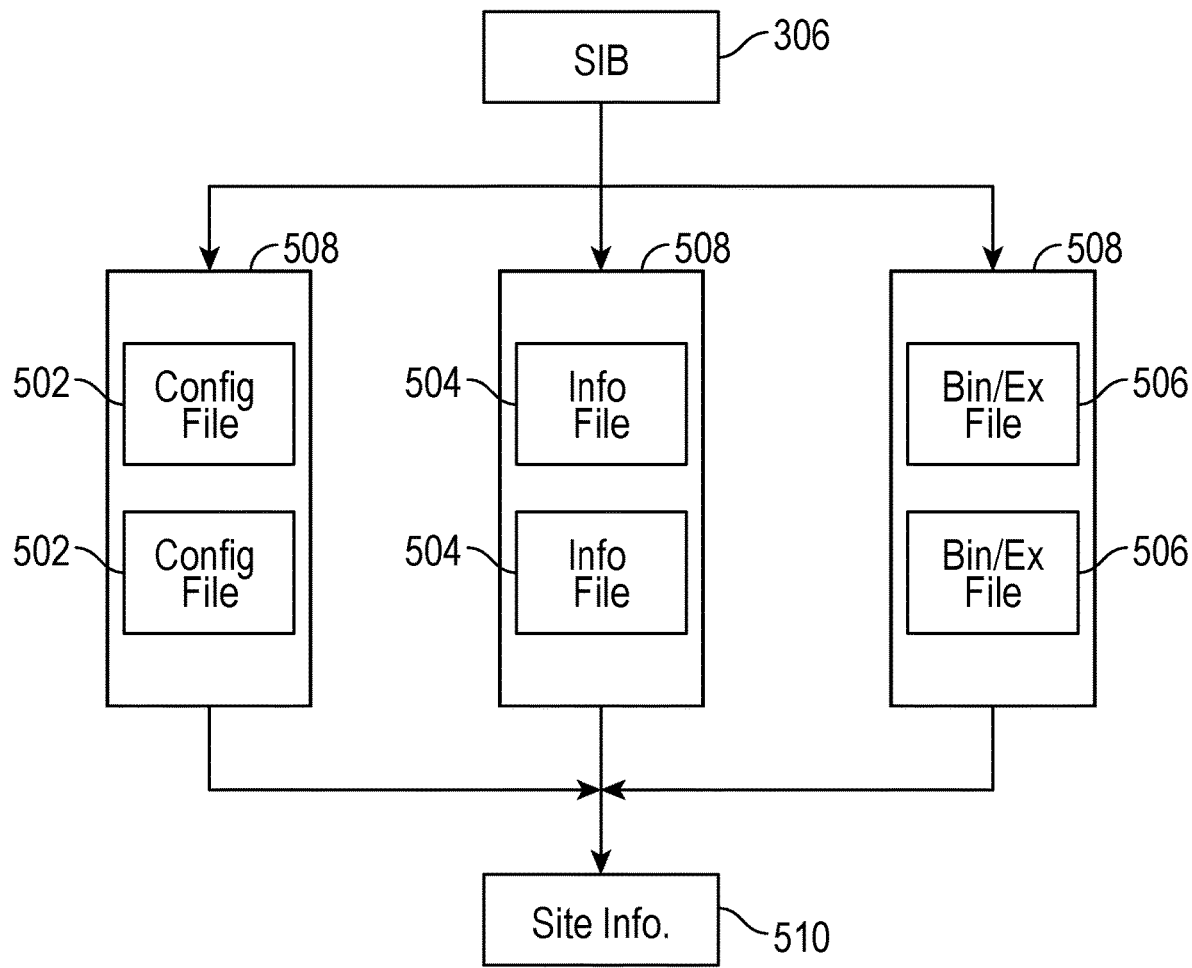
FIG. 5 shows a directory structure consistent with this disclosure.

As shown in FIG. 5, pressing the SIB can cause the terminal to search one or more configuration files 502, information files 504, and bin/executable files 506 that may be stored in one or more directories 508. During the execution of stage 406 each of the directories 508 can be searched to identify files, such as configuration files 502, information files 504, etc. that may contain information about the site. For instance, a configuration file can be identified by a ".config" extension and a information file may be identified by a ".ini" extension. Upon searching the various files, site information 510 can be extracted from the files. For example, upon encountering a site identifier, number of terminals, terminal identifier, physical location of a terminal, or other information such as terminal data 208, the information can be extracted from the file and displayed in information window 308. Upon displaying the site information, the user of the terminal can read the information to a customer support representative.

Upon extracting the various site information, method 400 can proceed to stage 408 were a connection can be established. For example, a remote connection can be established between a local terminal the user is using and a remote terminal that a customer support representative is using. Once the remote connection is established, the site information can be transmitted from the local terminal to the remote terminal (410). The site information can be transmitted to the remote terminal and auto populate fields for the customer support representative. For example, the site information containing the terminal ID can be auto populated into fields so that the customer support representative does not have to manual key in the site information.

The remote connection can allow the customer support representative to take control of the local terminal. For example, upon the remote terminal receiving the site information, the local terminal can enter a service mode (412). While in the service mode, the customer support representative can perform troubleshooting and/or perform other tasks needed to get the local terminal back online and operational. For example, while in the service mode, the customer support representative can install updated drivers, reset configuration settings, reinstall configuration corrupt files, etc. In addition, the remote connection can allow the local user to perform action under the direction of the customer support representative while the customer support representative observes via the remote connection.

One skilled in the art will understand in view of the present disclosure that the stages of method 400 can be rearranged and/or various stages can be omitted without departing from the scope of this disclosure. For example, the remote connection (408) and transmission of site information (410) can be omitted.

Examples and Notes

The following, non-limiting examples, detail certain aspects of the present subject matter to solve the challenges and provide the benefits discussed herein, among others.

Example 1 is a method for servicing a local terminal, the method comprising: displaying, at the local terminal, a user interface on a display of the terminal, the user interface including a site information button; receiving, at the local terminal, a user input that corresponds to a user pressing the site information button; and retrieving site information from a memory of the local terminal, the site information including diagnostic information for the local terminal.

In Example 2, the subject matter of Example 1 optionally includes wherein the diagnostic information includes a site identifier that identifies the local terminal from a plurality of local terminals.

In Example 3, the subject matter of any one or more of Examples 1-2 optionally include wherein retrieving the site information from the memory of the local terminal comprises extracting the site information from a plurality of files stored in the memory.

In Example 4, the subject matter of Example 3 optionally includes searching a plurality of directories for the plurality of files, wherein each of the plurality of files is stored in a respective one of the plurality of directories.

In Example 5, the subject matter of any one or more of Examples 1-4 optionally include establishing a remote connection between the local terminal and a remote terminal.

In Example 6, the subject matter of Example 5 optionally includes entering, by the local terminal, a service mode upon the remote connection being established.

In Example 7, the subject matter of any one or more of Examples 1-6 optionally include transmitting the site information to a remote terminal.

Example 8 is a local terminal serviceable by a remote terminal, the local terminal comprising: a display; a processor in electrical communication with the display; and a memory storing instructions that, when executed by the processor, causes the processor to perform actions comprising: displaying a user interface on the display, the user interface including a site information button, receiving a user input via the display that corresponds to a user pressing the site information button, and extract site information from the memory, the site information including diagnostic information for the local terminal.

In Example 9, the subject matter of Example 8 optionally includes wherein the diagnostic information includes a site identifier that identifies the local terminal from a plurality of local terminals.

In Example 10, the subject matter of any one or more of Examples 8-9 optionally include wherein extracting the site information from the memory of the local terminal comprises extracting the site information from a plurality of files stored in the memory.

In Example 11, the subject matter of Example 10 optionally includes wherein the actions further comprise searching a plurality of directories for the plurality of files, wherein each of the plurality of files is stored in a respective one of the plurality of directories.

In Example 12, the subject matter of any one or more of Examples 8-11 optionally include wherein the actions further comprise establishing a remote connection between the local terminal and the remote terminal.

In Example 13, the subject matter of Example 12 optionally includes wherein the actions further comprise entering a service mode by the local terminal upon the remote connection being established.

In Example 14, the subject matter of any one or more of Examples 8-13 optionally include wherein the actions further comprise transmitting the site information to the remote terminal.

In Example 15, the subject matter of any one or more of Examples 8-14 optionally include wherein the actions further comprise displaying a site identifier on the display.

Example 16 is a system comprising: a remote terminal; and a local terminal comprising a display and a memory, the local terminal operable to perform actions comprising: displaying a user interface on the display, the user interface including a site information button, receiving a user input via the display that corresponds to a user pressing the site information button, extract site information from a plurality of files stored in the memory, the site information including diagnostic information and a site identifier for the local terminal, and transmit the site information to the remote terminal.

In Example 17, the subject matter of Example 16 optionally includes wherein the site identifier identifies the local terminal from a plurality of local terminals.

In Example 18, the subject matter of any one or more of Examples 16-17 optionally include wherein the actions further comprise searching a plurality of directories for the plurality of files, wherein each of the plurality of files is stored in a respective one of the plurality of directories.

In Example 19, the subject matter of any one or more of Examples 16-18 optionally include wherein the actions further comprise: establishing a remote connection between the local terminal and the remote terminal; and entering a service mode upon the remote connection being established.

In Example 20, the subject matter of any one or more of Examples 16-19 optionally include wherein the actions further comprise displaying a site identifier on the display of the local terminal.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for servicing a local terminal, the method comprising:
    displaying, at the local terminal, a user interface on a display of the local terminal, the user interface including a site information button;
    receiving, at the local terminal, a user input that corresponds to a user pressing the site information button; and
    retrieving site information from a memory of the local terminal, the site information including diagnostic information for the local terminal.

2. The method of claim 1, wherein the diagnostic information includes a site identifier that identifies the local terminal from a plurality of local terminals.

3. The method of claim 1, wherein retrieving the site information from the memory of the local terminal comprises extracting the site information from a plurality of files stored in the memory.

4. The method of claim 3, further comprising searching a plurality of directories for the plurality of files, wherein each of the plurality of files is stored in a respective one of the plurality of directories.

5. The method of claim 1, further comprising establishing a remote connection between the local terminal and a remote terminal.

6. The method of claim 5, further comprising entering, by the local terminal, a service mode upon the remote connection being established.

7. The method of claim 1, further comprising transmitting the site information to a remote terminal.

8. A local terminal serviceable by a remote terminal, the local terminal comprising:
a display;
a processor in electrical communication with the display, and
a memory storing instructions that, when executed by the processor, causes the processor to perform actions comprising:
displaying a user interface on the display, the user interface including a site information button,
receiving a user input via the display that corresponds to a user pressing the site information button, and
extract site information from the memory, the site information including diagnostic information for the local terminal.

9. The local terminal of claim 8, wherein the diagnostic information includes a site identifier that identifies the local terminal from a plurality of local terminals.

10. The local terminal of claim 8, wherein extracting the site information from the memory of the local terminal comprises extracting the site information from a plurality of files stored in the memory.

11. The local terminal of claim 10, wherein the actions further comprise searching a plurality of directories for the plurality of files, wherein each of the plurality of files is stored in a respective one of the plurality of directories.

12. The local terminal of claim 8, wherein the actions further comprise establishing a remote connection between the local terminal and the remote terminal.

13. The local terminal of claim 12, wherein the actions further comprise entering a service mode by the local terminal upon the remote connection being established.

14. The local terminal of claim 8, wherein the actions further comprise transmitting the site information to the remote terminal.

15. The local terminal of claim 8, wherein the actions further comprise displaying a site identifier on the display.

16. A system comprising:
a remote terminal; and
a local terminal comprising a display and a memory, the local terminal operable to perform actions comprising:
displaying a user interface on the display, the user interface including a site information button,
receiving a user input via the display that corresponds to a user pressing the site information button,
extract site information from a plurality of files stored in the memory, the site information including diagnostic information and a site identifier for the local terminal, and
transmit the site information to the remote terminal.

17. The system of claim 16, wherein the site identifier identifies the local terminal from a plurality of local terminals.

18. The system of claim 16, wherein the actions further comprise searching a plurality of directories for the plurality of files, wherein each of the plurality of files is stored in a respective one of the plurality of directories.

19. The system of claim 16, wherein the actions further comprise:
establishing a remote connection between the local terminal and the remote terminal; and
entering a service mode upon the remote connection being established.

20. The system of claim 16, wherein the actions further comprise displaying a site identifier on the display of the local terminal.

* * * * *